United States Patent [19]

Okada et al.

[11] Patent Number: 4,634,916
[45] Date of Patent: Jan. 6, 1987

[54] PIEZOELECTRIC ROTARY DRIVER

[75] Inventors: Kozo Okada; Michiyuki Masuda, both of Nagoya; Sadayuki Ueha, Machida, all of Japan

[73] Assignee: NGK Spark Plug Co., Ltd., Japan

[21] Appl. No.: 782,211

[22] Filed: Sep. 30, 1985

[30] Foreign Application Priority Data

Oct. 2, 1984 [JP] Japan ................................ 59-207670
Dec. 12, 1984 [JP] Japan ................................ 59-263648
Mar. 8, 1985 [JP] Japan ................................. 60-46981

[51] Int. Cl.$^4$ .......................................... H01L 41/08
[52] U.S. Cl. .................................... 310/323; 310/328; 310/366; 310/317
[58] Field of Search ............... 310/324, 323, 328, 317, 310/366

[56] References Cited

U.S. PATENT DOCUMENTS

| | | | |
|---|---|---|---|
| 4,019,073 | 4/1977 | Vishnevsky et al. | 310/333 X |
| 4,484,099 | 11/1984 | Kawai et al. | 310/323 X |
| 4,495,432 | 1/1985 | Katsuma et al. | 310/328 |
| 4,513,219 | 4/1985 | Katsuma et al. | 310/328 |
| 4,560,263 | 12/1985 | Katsuma et al. | 310/323 X |
| 4,562,373 | 12/1985 | Tokusima et al. | 310/328 |
| 4,562,374 | 12/1985 | Sashida | 310/328 |

FOREIGN PATENT DOCUMENTS 0604058  4/1978  U.S.S.R. ............................ 310/333

*Primary Examiner*—Mark O. Budd
*Attorney, Agent, or Firm*—Darby & Darby

[57] ABSTRACT

A rotary driver is disclosed, which comprises a solenoidal oscillation element consisting of an electrostriction element polarized in radial directions or vertical directions and provided with electrodes on pair opposite surfaces perpendicular to the direction of polarization. The electrode on either one of the pair opposite surfaces is uniformly divided by x greater than four. AC voltages of $V_o \sin \omega t$ shifted in phase from each other by $2\pi/x$ are applied to the division electrodes. A driven member is held in contact with at least one of the opposite surfaces of the solenoidal oscillation element.

6 Claims, 20 Drawing Figures

PIEZOELECTRIC ROTARY DRIVER

BACKGROUND OF THE INVENTION

1. Field of the Invention:

This invention relates to a rotary driver using an oscillation element for driving an oscillatory wave motor or the like.

2. Description of the Prior Art:

Japanese Patent Provisional Publication No. 58-148682/83, Japanese Patent Provision Publication No. 59-96881/84 and Japanese Patent Provision Publication No. 59-96883/84 disclose rotary drivers using oscillation elements such as electro-striction elements.

In any of these rotary drivers, a plurality of electrostriction elements are combined into a solenoidal form and are polarized in alternately opposite directions in the circumferential direction. AC voltages are applied to the electrostriction elements to produce a traveling wave in the form of a phase-shifted oscillation along the end surfaces in the circumferential direction, thus driving a driven member in contact with the end surfaces.

SUMMARY OF THE INVENTION

In the prior art rotary drivers as noted above, it is necessary to arrange a plurality of electrostriction elements polarized in different directions into a solenoidal form. Therefore, the construction is complicated.

The present invention has an object of providing a rotary driver which consists of a single electrostriction element.

According to the present invention, there is provided a rotary driver, which comprises a solenoidal oscillation element consisting of an electrostriction element polarized in radial directions or vertical direction and provided with electrodes on pair opposite surfaces perpendicular to the direction of polarization, the electrode on either one of the pair opposite surfaces being uniformly divided by x greater than four, AC voltages of $V_o \sin \omega t$ shifted in phase from each other by $2\pi/x$ in the circumferential direction being applied to the division electrodes, a driven member being held in contact with at least one of the opposite surfaces of the solenoidal oscillation element.

The driven member may be held in contact with the surface of the solenoidal oscillation element directly or via a contactor or the like.

The operational principles of the present invention will now be described.

Figure 1:
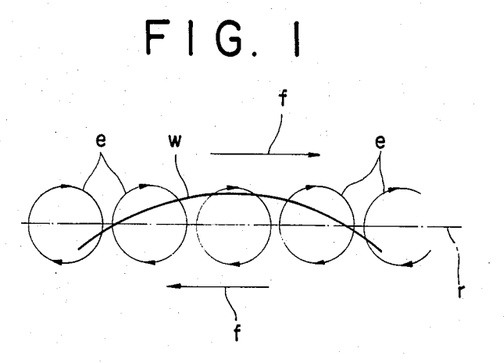
FIG. 1 is a view showing the principles underlying the present invention.

Typical oscillation modes of a solenoid r include one, which is called extension mode and has elongation and contraction (longitudinal wave) w in the circumferential direction peculiar to the solenoid r. This wave also has displacements in vertical planes. For this reason. When a traveling wave of the extension mode is oscillated, all the mass points of the solenoid r execute elliptical motions e, as shown in FIG. 1, and a thrust f can be obtained in the vertical planes. FIG. 1 shows orbits of mass points when the solenoid r is depicted as a horizontal front view.

Figure 2:
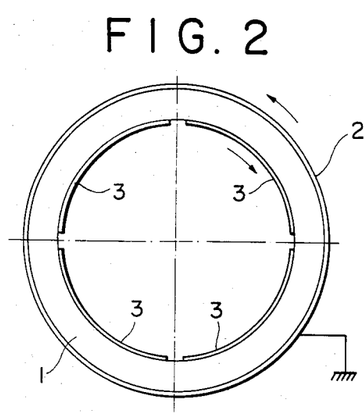
FIGS. 2 and 3 are a plan view and a perspective view showing the basic structure.
Figure 3:
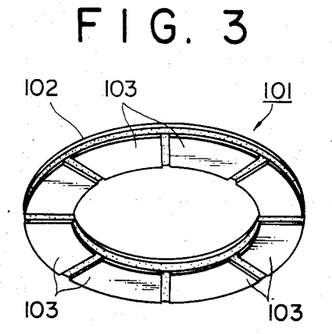
Figure 4:
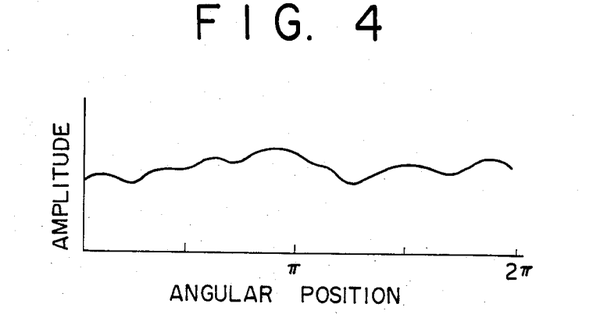
FIG. 4 is a graph showing an amplitude distribution graph.

To obtain this oscillation, according to the present invention a solenoidal oscillation element 1 is radially polarized as shown in FIG. 2, and AC voltages of $V_o \sin \omega t$ which are shifted in phase from one another by $2\pi/x$ are respectively applied to four or more division electrodes 3 in contact with either one of the electrodes 2 and 3 provided on the inner and outer peripheries. By so doing, the intended oscillation of the traveling wave of the extension mode can be obtained. Also, a solenoidal oscillation element 101 is polarized in vertical direction as shown in FIG. 3, and AC voltages of $V_o \sin \omega t$ which are shifted in phase from one another by $2\pi/x$ are respectively applied to four or more division electrodes 103 in contact with either one of the electrodes 102 and 103 provided on the upper and lower surfaces. By so doing, the intended oscillation of the traveling wave of the extension mode again can be obtained. The amplitude of the oscillation in the radial direction and vertical directions has been optically measured using a photonic sensor. FIG. 4 shows the result of measurement. As is shown, an amplitude waveform which is free from node in the circumferential direction can be confirmed. In addition, microscopic observation shows that the all points of the solenoid are executing a circular motion.

When objects or members to be driven were brought to be in forced contact with the inner and outer electrodes 2 and 3, thrusts were produced, causing excursion of the driven members.

If the number of division electrodes is four or above and the dividing number x is three or less, the amplitude waveform will have nodes where the thrust is reduced. If the number of division electrodes is large, a uniform amplitude distribution in the circumferential direction can be obtained.

The above-mentioned and other objects and features of the invention will become apparent from the following detailed description taken in conjunction with the drawings which indicate embodiments of the invention.

BRIEF DESCRIPTION OF THE DRAWINGS

The accompanying drawings illustrate embodiments of the present invention, in which.

DETAILED DESCRIPTION OF THE PREFERRED EMBODIMENTS

Figure 5:
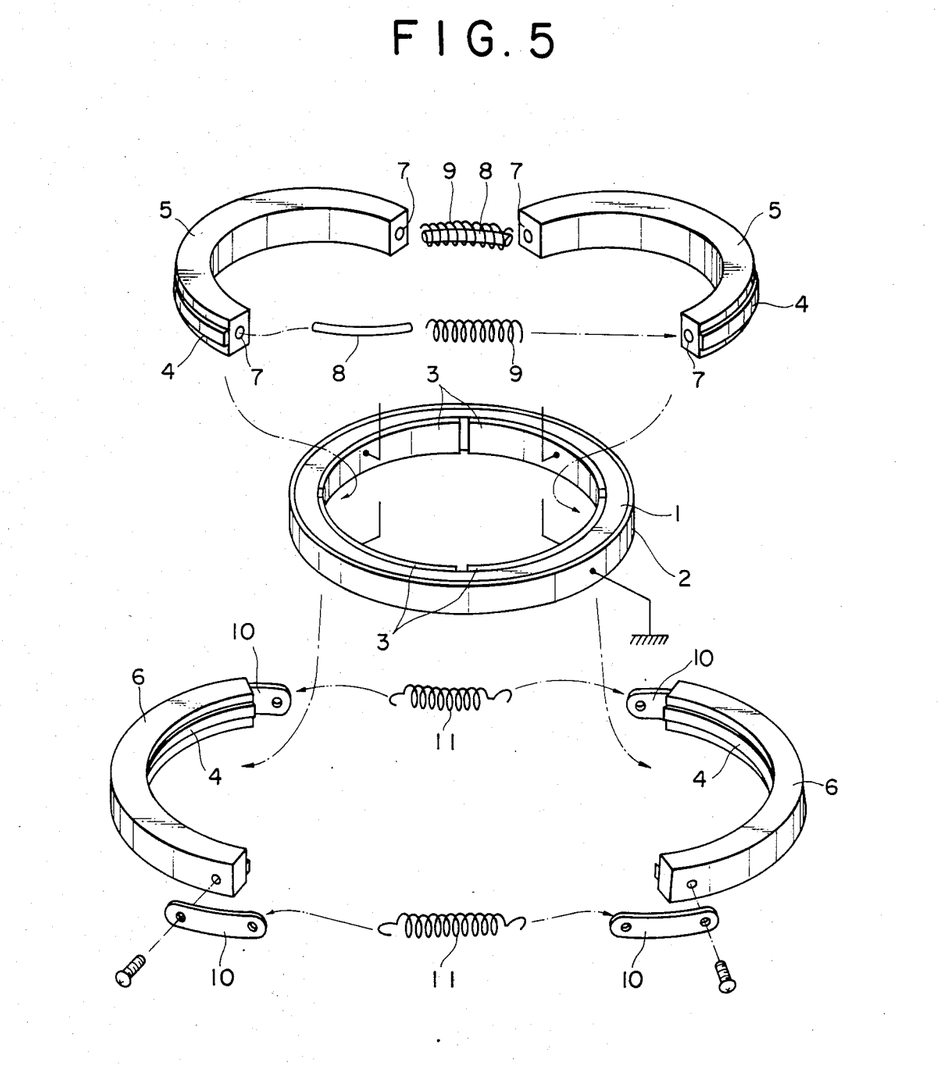
FIG. 5 is an exploded perspective view showing a first embodiment of the present invention.
Figure 6:
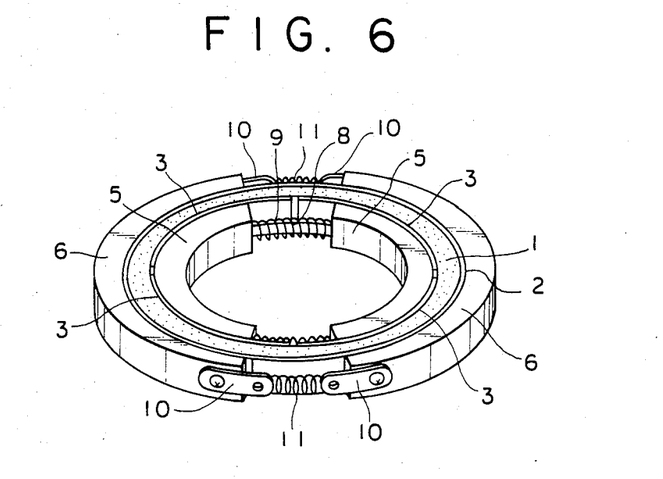
FIG. 6 is a perspective view showing the first embodiment in the assembled state.
Figure 7:
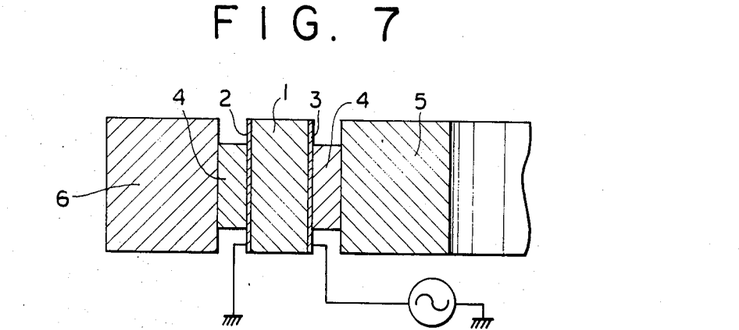
FIG. 7 is a longitudinal sectional view.

FIGS. 5 to 7 show an embodiment of the present invention.

A solenoidal oscillation element 1 consists of a ceramic electrostriction element consisting of PZT or the like. It is radially polarized such that its inner side is positive and its outer side is negative. Its outer periphery is provided with a ground side electrode 2, and its inner periphery is divided into four divisions, which are provided with respective division electrodes 3. Semicircular inner ring halves 5 are provided on the inner periphery of the element 1 such that their contactor portions 4 are in contact with the element 1. Semi-circular outer ring halves 6 are provided on the outer periphery of the element 1 such that their contactor portions 4 are in contact with the element 1. The inner ring halves 5 have arcular bores 7 formed from both the ends. An arcular connector 8 have its opposite end portions inserted in opposed bores 7 of the inner ring halves 5, and a compression spring 9 is fitted on the arcular connector 8. Secured to the outer surface of the opposite ends of the outer ring halves 6 are spring retainers 10, and a tensile spring 11 is hooked at the opposite ends in through holes formed in opposed spring retainers 10 of the outer ring halves 6. The inner ring halves 5 are urged against the inner periphery of the solenoidal oscillation element 1 by the compression springs 9, while the outer ring halves 6 are urged against the outer periphery of the solenoidal oscillation element 1 by the tensile springs 11.

The contactor portions 4, as shown in FIG. 7, consist of a vinyl sheet lamination or the like and have a thickness of approximately 1 mm. Their width is made smaller than the width of the solenoidal oscillation element 1, thus forming clearances between the solenoidal oscillation element 1 and inner and outer rings 5 and 6 and permitting the connection of the electrodes 2 and 3 on the inner and outer sides of the solenoidal oscillation element 1 to leads.

Voltages of $V_o \sin \omega t$ which are shifted in circumferential phase by $\pi/2$ are applied to the four division electrodes 3.

Figure 8:
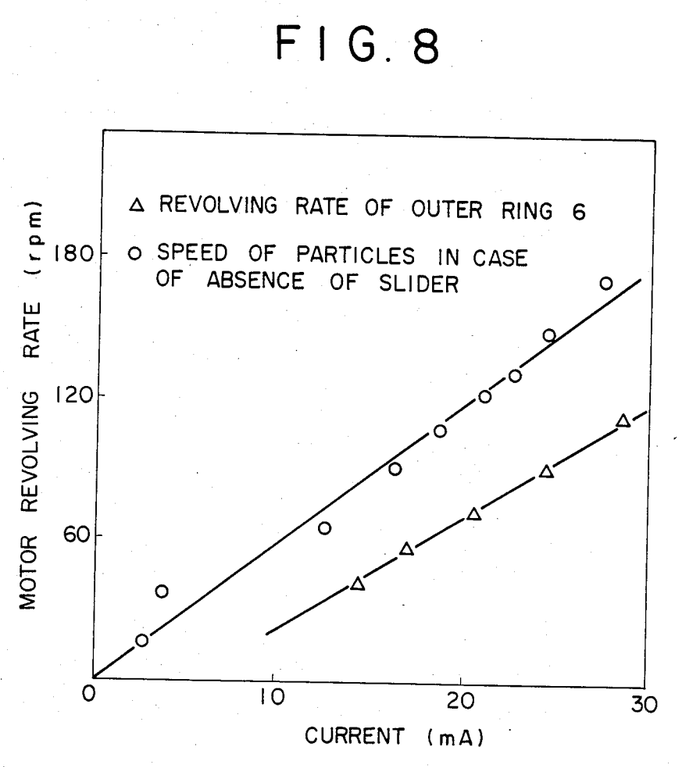
FIG. 8 is a graph showing the relation between current and revolving rate of the driven member.

FIG. 8 shows the revolving rate of the outer ring 6 (or inner ring 5) plotted against current in case where the solenoidal oscillation element 1 is made stationary while the outer or inner ring is made rotatable.

As is seen from the graph, with this embodiment a high revolving rate of 120 rpm can be obtained with a current of 30 mA.

The rotary driven object noted above may be constituted by the outer ring 6 (or inner ring 5), or it may be constituted by a driven member coupled to the outer ring 6 (or inner ring 5), thus permitting the rotation of the driven member.

Figure 9:
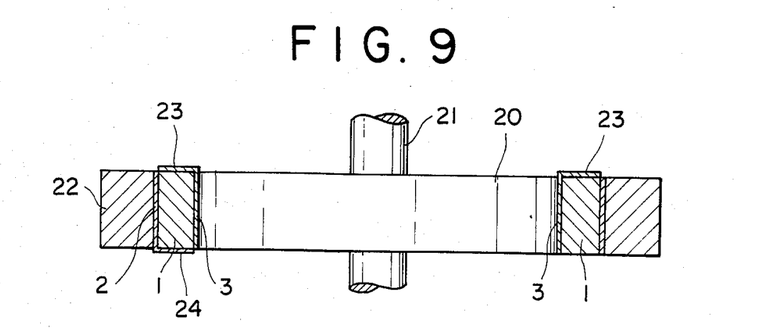
FIG. 9 is a longitudinal sectional view showing a second embodiment.

FIG. 9 shows a second embodiment of the present invention. In this instance, a disk 20 is held in contact with the inner periphery of the solenoidal oscillation element 1. A shaft 21 penetrates the center of the disk 20 to hold it without rotation. A driven member 20 is fitted on the outer periphery of the solenoidal oscillation element 1. The top surface of the solenoidal oscillation element 1 is provided with insulated terminals 23 connected to the division electrodes 3 so that voltages shifted in phase from one another can be applied to the division electrodes 3. The bottom surface of the solenoidal oscillation element 1 is provided with an exposed terminal 24 connected to the ground side electrode 2, thus facilitating the grounding thereof.

With the above construction, the disk 20 is held stationary, and the solenoidal oscillation element 1 and driven member 22 are made rotatable. The driven member 22 thus can be rotated at double the speed of rotation of the solenoidal oscillation element 1.

If a stationary member is held in contact with the outer periphery of the solenoidal oscillation element 1, a high speed rotation of the disk 20 can be produced.

To prevent the wear of the solenoidal oscillation element 1 in the above embodiments, rings of wear-resistant material may be provided on the inner and outer peripheries of the solenoidal oscillation element 1, and the inner and outer rings 5 and 6 or disk 20 or driven member 22 may be held in contact with these rings.

Further, in the above embodiments the division electrodes may be provided either on the inner or outer periphery of the solenoidal oscillation element 1. Further, where the number of divisions is four or above and the dividing number is x, AC voltages shifted in phase from one another by $2\pi/x$ are applied. The greater the number of divisions is, the more the amplitude distribution in the radial direction is uniform.

Figure 10:
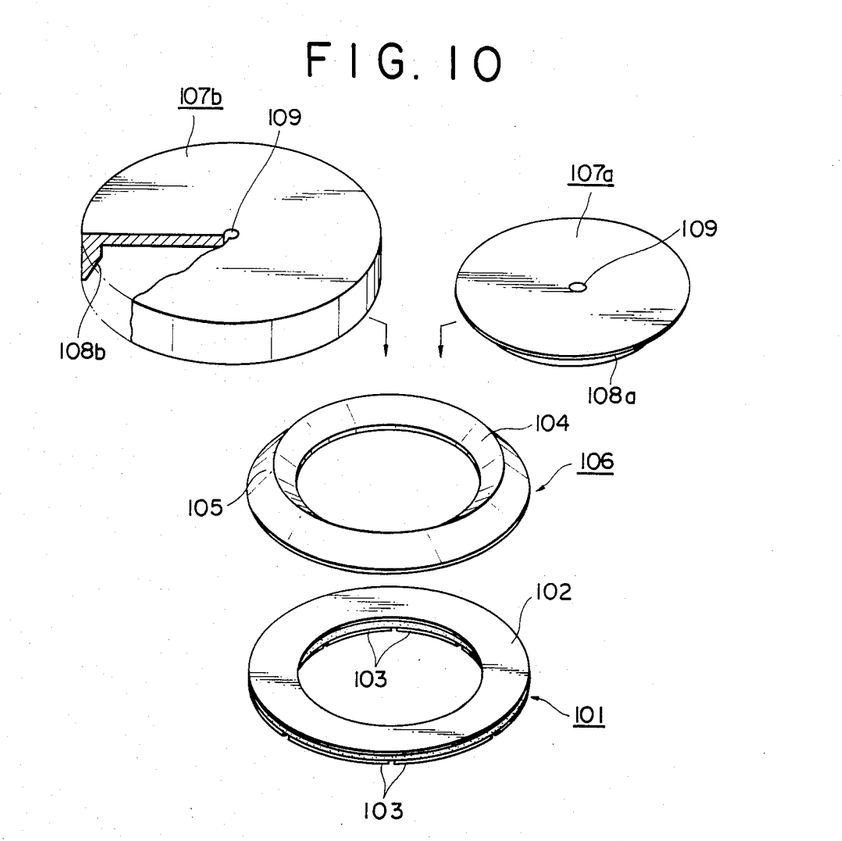
FIG. 10 is an exploded perspective view showing a third embodiment of the present invention.
Figure 11:
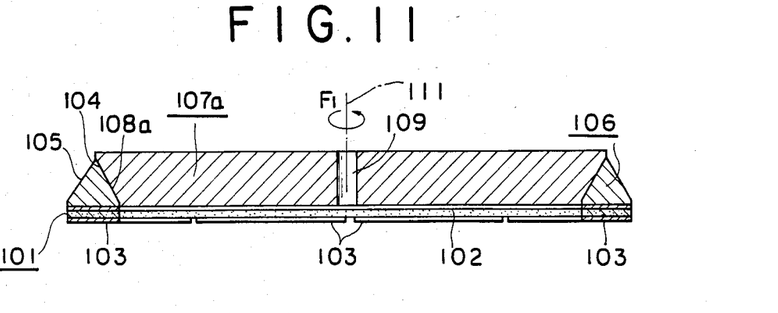
FIGS. 11 and 12 are longitudinal sectional views showing the embodiment in the assembled state.
Figure 12:
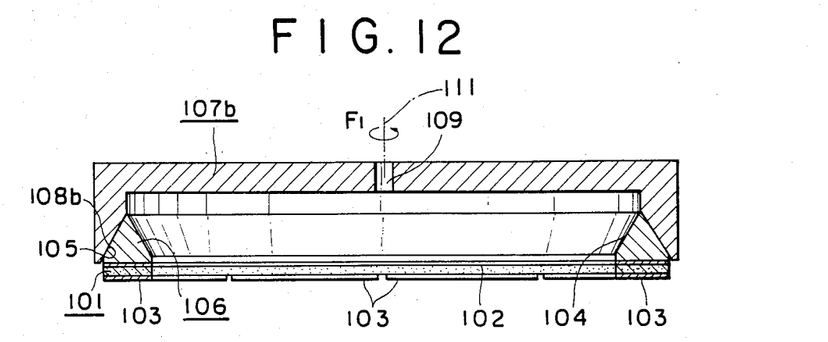

FIGS. 10 to 12 show a third embodiment of the present invention. In this case, a solenoidal oscillation element 101, like the element 1 noted above, is a ceramic electrostriction element consisting of PZT or the like. The element 101 is polarized in the vertical directions such that its top surface is negative and its bottom surface is positive. Its top surface is provided with a ground side electrode 102, and its bottom surface is uniformly divided into eight divisions, which are provided with respective division electrodes 103. A drive ring 106 consisting of duralumin is bonded to the top electrode 102. The drive ring 106 has a sectional profile of an isosceles triangle having outer and inner inclined surfaces 104 and 105 having an equal inclination angle.

As shown in FIGS. 10 and 11, a disk-like slider (i.e., driven member) 107a is fitted in the drive ring 106 such that its outer periphery 108a is in plane contact with the inner inclined surface 104 of the drive ring 106.

Further, as shown in FIGS. 10 and 12, a dish-shaped slider (i.e., driven member) 107b is fitted on the drive ring 106 such that its inner periphery 108b is in plane contact with the outer inclined surface 105 of the drive ring 106.

In this embodiment, the solenoidal oscillation element 101 and drive ring 106 are held stationary, and voltages of $V_o \sin \omega t$ shifted in circumferential phase from one another by $\pi/4$ are applied to the eight division electrodes 103, whereby the sliders 107a and 107b are given a torque F1.

Figure 13:
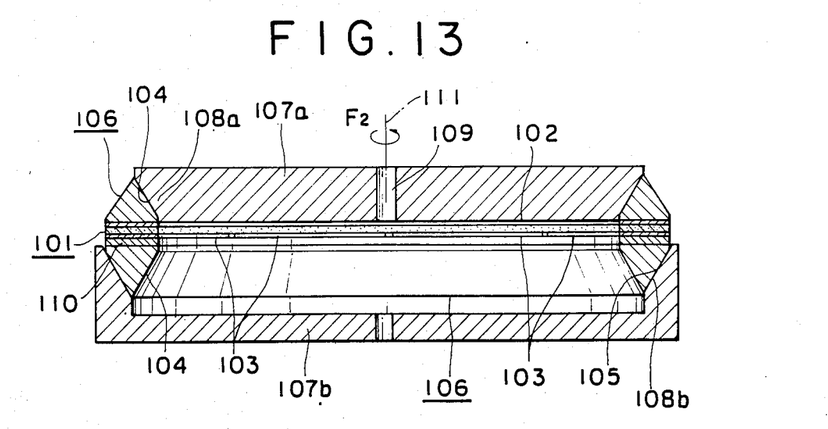
FIG. 13 is a longitudinal sectional view showing a fourth embodiment.

FIG. 13 shows a fourth embodiment of the present invention. The bottom surface of the solenoidal oscillation element 101 is provided with an insulating layer 110 to insulatingly cover the electrodes 103. The lower drive ring 106 is bonded to the insulating layer 110, and the stationary slider 107b is fitted on the lower drive ring 106. With this arrangement, by applying a voltage to the electrode 102, the slider 107a fitted in the upper drive ring 106 is given a double torque F2.

The drive ring 106 may have various shapes, and it may have only a single inclined surface.

Torque may be taken out from the sliders 107a and 107b with various means, e.g., a shaft 111 penetrating a central hole 109 of the disk.

In the third and fourth embodiments, the drive ring and slider are in plane contact with each other. The surfaces which are in plane contact in the circumferential direction, however, require very high precision for formation, and such a high precision is practically difficult to realize. Therefore, elliptical excentricity is liable to result in the rotation of the slider. Such excentricity of rotation tends to be promoted with wear of the surfaces in contact with each other. This is undesired from the standpoint of taking out stable torque.

FIGS. 15 to 19 show further embodiments, which are improvement sover the third and fourth embodiments and provide a rotary driver free from rotational irregularities.

Figure 14:
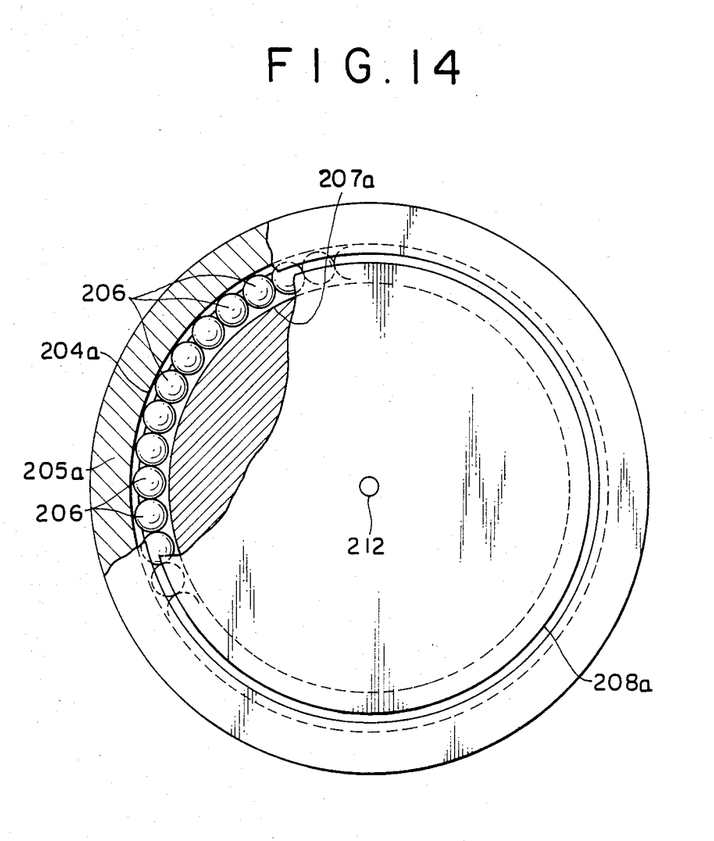
FIG. 14 is a plan view, partly broken away, showing a fifth embodiment of the present invention.
Figure 15:
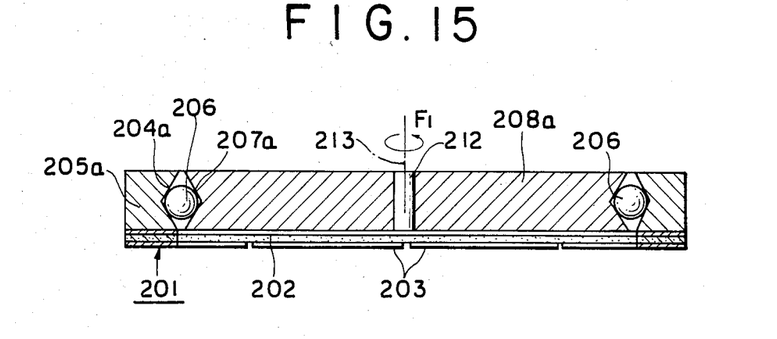
FIG. 15 is a longitudinal sectional view showing the fifth embodiment.

FIGS. 14 and 15 show a fifth embodiment. In this case, the solenoidal oscillation element 201 is a ceramic electrostriction element consisting of PZT or the like. The solenoidal oscillation element 201 is polarized in the vertical directions such that its top surface is negative and its bottom surface is positive. Its top surface is provided with a ground side electrode 202, and its bottom surface is divided uniformly into eight divisions, which are provided with respective division electrodes 203. A drive ring 205a made of duralumin and having a V-shaped inner driving surface 204a is provided on the electrode 202 formed on the top.

A disk-like slider 208a having a V-shaped outer peripheral feeding surface 207a facing the driving surface 204a is fitted on the drive ring 205a via a plurality of rotors 206.

The rotors 206 are desirably readily capable of taking out frictional force. Where the drive ring 205a is made of metal, the rotors are suitably mode of a material, which has a surface softer than that of metal like vinyl chloride, is harder than rubber and has a large coefficient of friction.

The rotors 206 are arranged in close contact with one another in the circumferential direction in the gap between the driving surface 204a and feeding surface 207a, as shown in FIG. 14.

Figure 16:
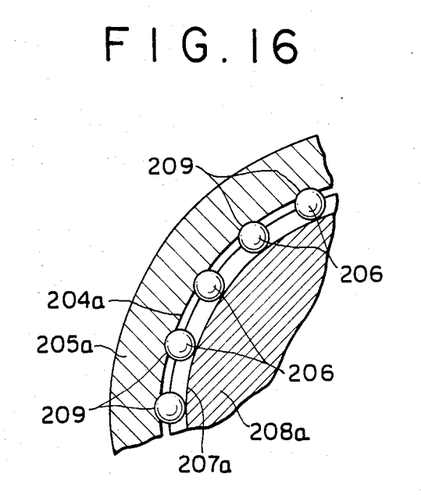
FIG. 16 is a fragmentary sectional view showing a modification of the embodiment of the present invention.

The rotors 206 may be provided in a spaced-apart arrangement as shown in FIG. 16. In this case, in order to maintain a constant gap between adjacent rotors 206, it is necessary to form the driving surface 204a with spherical recesses 209, in which the rotors 206 are received and held at fixed positions relative to the drive ring 205a. The rotors 206 may be replaced with various gap holding means. The rotors 206 should be three or more in number to support the slider 208a at three or more points, and they should be uniformly spaced apart.

Figure 17:
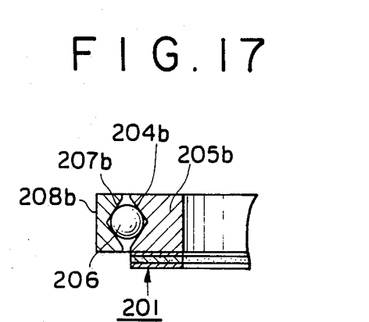
FIG. 17 is a fragmentary sectional view showing a sixth embodiment of the present invention.

FIG. 17 shows a sixth embodiment of the present invention. In this case, a drive ring 205b has a V-shaped outer peripheral driving surface 204b, and a ring-like slider 208b having a V-shaped inner peripheral feeding surface 207b is fitted on the driving ring 205b via the rotors 206.

Figure 18:
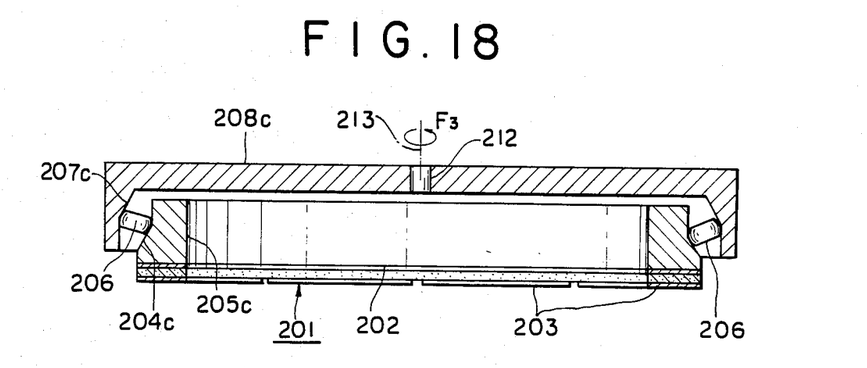
FIG. 18 is a longitudinal sectional view showing a seventh embodiment of the present invention.

FIG. 18 shows a seventh embodiment. In this case, a dish-like slider 208c having an inner peripheral feeding surface 207c is fitted on a drive ring 205c having an outer peripheral driving surface 204c via the rotors 206.

Figure 19:
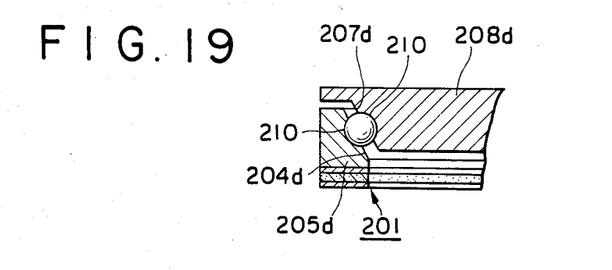
FIG. 19 is a fragmentary sectional view showing an eigth embodiment of the present invention.

FIG. 19 shows an eighth embodiment. In this case, a slider 208d having an outer peripheral feeding surface 207d is fitted on a drive ring 205d having an inner peripheral driving surface 204d via the rotors 206. In this embodiment, a plurality of rotors 206 are fitted in annular grooves 210 having an arcular sectional profile formed in the driving surface 204d and feeding surface 207d in the circumferential direction.

In the fifth to eighth embodiments, the drive rings 205a to 205d are held stationary, and voltages of V sin ωt shifted in circumferential phase from one another by π/4 are applied to the eight division electrodes 203, whereby the sliders 208a to 208d are given a torque $F_3$.

Figure 20:
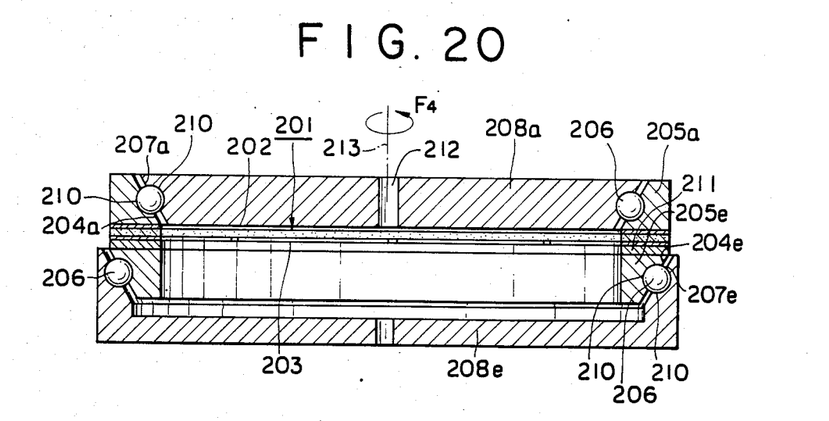
FIG. 20 is a longitudinal sectional view showing a ninth embodiment of the present invention.

FIG. 20 shows a ninth embodiment, which is a development from the structure shown in FIG. 15. In this case, the electrodes 203 on the bottom surface of the solenoidal oscillation element 201 is insulatedly covered by an insulating layer 211, and a drive ring 205e is bonded to the lower surface of the insulating layer 211. A slider 208e having an inner peripheral feeding surface 207e is fitted on a driving surface 204e of the drive ring 205e via the rotors 206 provided between the driving surface 204e and feeding surface 207e. The slider 208e is held stationary. With this arrangement, by applying a voltage to the electrode 202 the slider 208a fitted on the upper drive ring 205 can be given a double torque F4. In this embodiment, the rotors 206 are fitted in the annular grooves 210 formed in the driving surface 204a, feeding surface 207a, driving surface 204e and feeding surface 207e.

The rotors 206 in the fifth to eighth embodiments may have a shape as shown in FIG. 20, with the peripheral surface in contact with the driving surface 204 and feeding surface 207. The peripheral surface may be spherical, cylindrical, conical, disk-like or the like and the shape may be suitably selected in conformity to the shape of the surface, with which the rotors are in contact.

The drive ring 205 may have various shapes.

Further, torque may be taken out from the sliders 208a and 207b with various means, e.g., a shaft 213 penetrating a central hole 212 of the disk.

Further, division electrodes may be provided on the top or bottom surface of the solenoidal oscillation elements 101 and 201 in the third to ninth embodiments. The division electrodes are four or more in number, and AC voltages shifted in phase from one another by 2 π/x where x is a dividing number are applied to the division electrodes. The greater the number of division electrodes is the more the amplitude distribution in the vertical directions is uniform.

As has been described in the foregoing, according to the present invention the solenoidal oscillation element 1 is polarized in the radial directions or vertical directions, the electrodes 2, 3, 102, 103, 202 and 203 are provided on the opposite surfaces of the element perpendicular to the direction of polarization, either one of these opposite surface side electrodes is uniformly divided by x greater than four, AC voltages of $V_o$ sin ωt shifted in circumferential phase from one another are applied to the respective division electrodes, and a driven member is held in contact with the periphery of the solenoidal oscillation element 1 to be driven by the element 1. Thus, rotational driving can be realized with a single solenoidal oscillation element, so that the construction can be simplified.

Further, with the structure of the third and fourth embodiments as claimed in claim 3, where the solenoidal oscillation element 101 is polarized in the vertical directions, the electrodes 102 and 103 are provided on the top and bottom surfaces of the element 101, either one of these two opposite surface side electrodes is uniformly divided by x greater than four, AC voltages of $V \sin \omega t$ shifted in circumferential phase from one another by $2\pi/x$ are applied to the division electrodes, and the sliders (driven members) 107a and 107b are fitted on the inclined surfaces 104 and 105 of the drive ring 106 bonded to the solenoidal oscillation element 1 and are rotationally driven, the following effects can be obtained:

(a) The rotational driving can be realized with a single solenoidal oscillation element, so that the structure is simplified.

(b) Friction is caused between the inclined surfaces 104 and 105 on one hand and the counterpart surfaces 108a and 108b on the other hand, so that the solenoidal oscillation element 101 is free from wear.

(c) Since load acts on the inclined surfaces 104 and 105, proper contact force can be produced between the sliders 107a and 107b on one hand and the drive ring 106 on the other hand. Thus, it is possible to attain satisfactory transmission of torque with reduced slip.

Further, with the structure of the fifth to ninth embodiments as claimed in claim 4, where the drive ring 5 and slider 208 are coupled together via the rotors 206, the contact may be substantially point contact. Thus, the rotational irregularities can be reduced even where the driving surface 204 and feeding surface 207 are formed with low precision. Further, the wear of the driving surface 204 and feeding surface 207 is low. Thus, stabilized torque can be taken out continuously.

What is claimed is:

1. A rotary driver comprising:
   a solenoidal oscillation element consisting of an electrostriction element polarized in radial directions or vertical directions and provided with electrodes on pair opposite surfaces perpendicular to the direction of polarization, the electrode on either one of said pair opposite surfaces being uniformly divided by x greater than four, AC voltages of $V_o \sin \omega t$ shifted in circumferential phase from each other by $2\pi/x$ being applied to said division electrodes; and
   a driven member being held in contact with at least one of said opposite surfaces of said solenoidal oscillation element.

2. The rotary driver according to claim 1, wherein said solenoidal oscillation element consisting of an electrostriction element is polarized in radial directions and provided with electrodes on the inner and outer peripheral surfaces, the electrode on either one of said inner and outer peripheral surfaces being uniformly divided by x greater than four, AC voltages of $V_o \sin \omega t$ shifted in circumferential phase from each other by $2\pi/x$ being applied to said division electordes, a driven member being held in contact with the inner and outer peripheral surfaces or one of said surfaces of said solenoidal oscillation element.

3. The rotary driver according to claim 1, wherein said solenoidal oscillation element consisting of an electrostriction element is polarized in vertical directions and provided with electrodes on the upper and lower surfaces, the electrodes on either said upper or lower surface being uniformly divided by x greater than four, AC voltages of $V_o \sin \omega t$ shifted in circumferential phase from each other being applied to said division electrodes, a drive ring having inclined surfaces being bonded to at least said upper or lower surface of said solenoidal oscillation element, a driven member having a counterpart surface in plane contact with one of said inclined surfaces being fitted to said drive ring.

4. The rotary driver according to claim 3, wherein said solenoidal oscillation element consisting of an electrostriction element is polarized in vertical directions and provided with electrodes on the upper and lower surfaces, the electrode on either said upper or lower surface being uniformly divided by x greater than four, AC voltages of $V_o \sin \omega t$ shifted in circumferential phase from each other being applied to said division electrodes, a drive ring having a driving surface being bonded to at least the upper or lower surface of said solenoidal oscillation element, a driven member having a feeding surface facing said driving surface being fitted to said drive ring via three or more substantially uniformly spaced rotors provided between said driving surface and feeding surface.

5. The rotary driver according to claim 4, wherein said rotors are balls.

6. The rotary driver according to claim 4, wherein said rotors have spherical contact surfaces.

* * * * *